Dec. 17, 1963   J. E. GEIS   3,114,804
BIN LEVEL INDICATOR
Filed May 23, 1961   2 Sheets-Sheet 1
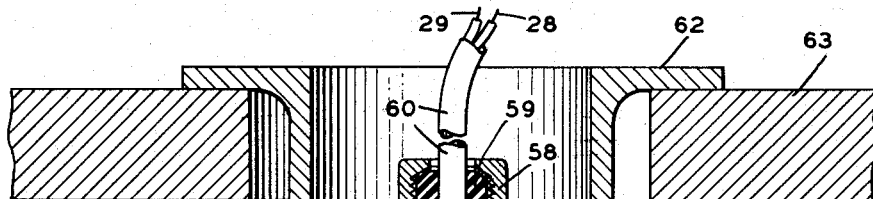
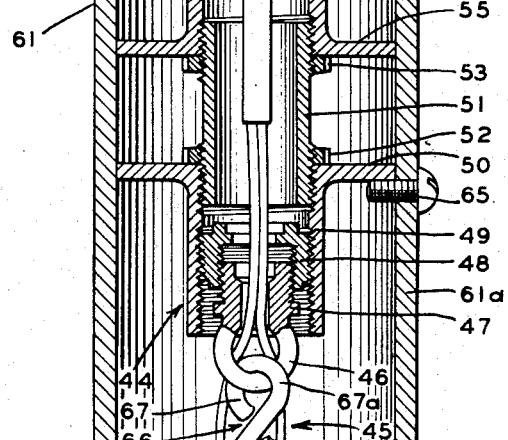
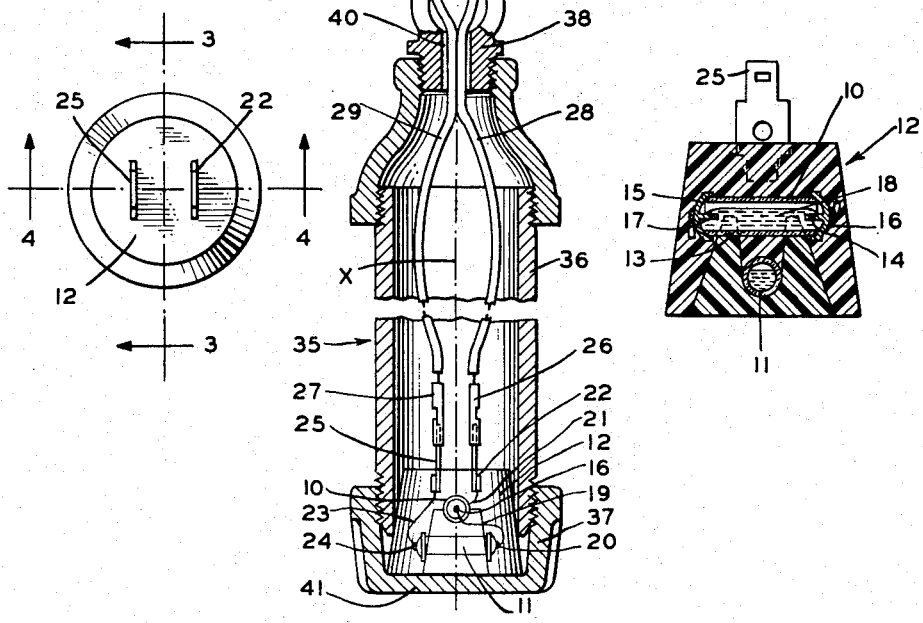
FIG. 1
FIG. 2
FIG. 3

Dec. 17, 1963    J. E. GEIS    3,114,804
BIN LEVEL INDICATOR

Filed May 23, 1961    2 Sheets-Sheet 2

United States Patent Office 3,114,804
Patented Dec. 17, 1963

3,114,804
BIN LEVEL INDICATOR
James E. Geis, Fishkill, N.Y., assignor to New York Trap Rock Corporation, West Nyack, N.Y., a corporation of New York
Filed May 23, 1961, Ser. No. 112,083
4 Claims. (Cl. 200—61.47)

This invention relates to level indicators and particularly to level indicators which may be used to indicate the level of pulverulent, granular, or lump material in open or closed bins or in other places, where moving material of that kind may be permanently or temporarily confined.

In systems for storing and conveying pulverulent, granular or lumpy material it is frequently desirable to provide some means for indicating the level of the material. In plants such as those where crushed rock or similar granular material is processed, transported, or otherwise handled in bins, or on conveyors, or otherwise, it is often necessary, or at least desirable, to know or to have an indication of the level of the material; or to know when a bin or container is full, partially full or empty. Frequently, such systems are closed from ordinary view and it is important to know when a receptacle is filled with material or to know the level of the granular material, in a receptacle or on a conveyor.

This invention provides a telltale or indicator device which is adapted for use in open or closed receptacles, containers, bins, or on conveyors. The device is contrived to be hung in such fashion that it is activated by the mobile granular material being handled, and upon actuation, to operate a visual or audible signal outside of the receptacle or container at a place near to or remote from the place where the telltale device is located; or it may be connected in an electrical circuit with relays and other suitable devices for automatic control of other mechanisms.

According to the invention there is provided a device of novel construction wherein a set of specially arranged mercury switches are mounted in a molded supporting and protective material which provides a supporting means for the mercury switches, in the form of a pendulum-bob. The switches are connected in an electrical circuit in such manner that the flow of current in the circuit is controlled in response to change in the level of the pile of material which will cause a change in the position of the mercury switches in relation to a reference axis. More specifically, the flow and interruption of current is controlled in response to change in position of the mercury switches in relation to a vertical axis through the pendulum-bob, which supports the mercury switches in fixed relation to each other.

In a preferred embodiment of the invention a pair of mercury switches are supported in fixed relation to each other, one at right angles to the other to form a cross, but one above the other. A typical mercury switch of the type referred to, comprises a hollow tubular glass body, closed at its ends, and containing a charge of liquid mercury. A contact element extends through each closed end into the hollow body. When the mercury switch is in normal position, i.e., its long axis in horizontal position, contact is made so that current may flow through the switch and when the switch is tilted so that its long axis is tilted to inclined position, the mercury flows to the lower end and the circuit is broken. Or, the switches may be of that type in which current flows when the switch is in tilted position and interrupted when it is in normal horizontal position. The switches, mounted so that one is superimposed on the other to form a cross, are maintained in fixed relationship by encasing them in a casing or capsule made of moldable material which after the material sets or is cured is sufficiently rigid to support the switches in the desired predetermined fixed relation. In other words, the mercury switches are encapsulated in a molded encasement or capsule and the switches, in a preferred embodiment, are connected in series by electrical conductors which extend through the enclosing capsule. The exposed two conductors may then be connected to lead-in wires which is turn may be long enough to be extended to a place remote from the location of the encapsulated switches, as described in further detail hereinafter.

The capsule, in which the mercury switches are molded, is preferably mounted in a steel housing which in turn is provided with bracket means to suspend the housing so that the housing may swing in pendulum fashion. The suspension means includes a connection in the nature of a universal joint so that the suspended housing (containing the capsulated mercury switches) forms a pendulum-bob which may swing in any direction from a vertical axis running through the universal joint; this universal joint serving as a suspension "point" for the pendulum. The lead-in conductor wires may be connected in a circuit with a source of current to operate a visible or audible signal device which may be located at a convenient place which may, if desired, be remote from the swinging pendulum device. And, if desired, the electrical circuit may include relays and other devices for automatically controlling the operations of other mechanisms.

Although the novel features which are believed to be characteritsic of the invention are pointed out in the annexed claims, the invention itself as to its objects and advantages and the manner in which it may be carried out may be better undestood by reference to the following more detailed description taken in connection with the accompanying drawings showing a preferred embodiment and forming a part hereof, in which FIG. 1 is a view in elevation and in section through a device embodying the invention;

FIG. 2 is a top plan view of the molded capsule which contains the mercury switches;

FIG. 3 is a view in elevation and in section of the molded capsule on line 3—3 of FIG. 2;

Figure 4:
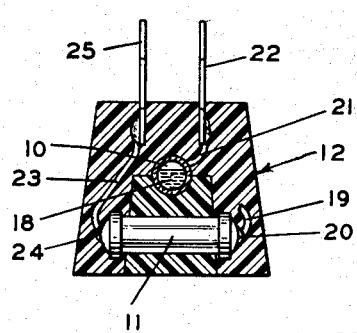
FIG. 4 is a view in elevation and in section of the molded capsule on line 4—4 of FIG. 2.

Referring now to the drawings, in which like reference characters denote like parts throughout the several views, the device shown generally in FIG. 1 may be referred to as a "bin level indicator" for convenience of description but it will be understood that the indicator device may be used wherever it may be suitably mounted for activation by a rising or falling pile or bulk of granular or pulverulent material. In general, the bin level indicator comprises a pair of mercury switches 10, 11, encapsulated in a capsule 12. A typical mercury switch comprises an elongate hollow tubular glass body 13, closed at both ends by closure members 14, 15. Conductor elements 16, 17 extend through the end closures. The body contains a charge of mercury 18 which contacts both end conductors 16, 17 when the switch lies in normal or horizontal position, as shown in FIG. 3. When such a switch is tipped from normal horizontal position the mercury runs toward the lower end and interrupts the conductive path from one end element to the other.

The two mercury switches 10, 11 are mounted at right angles to each other, switch 10 being mounted above switch 11 and in plan view they form a cross. A conductor wire 19 connects end conductor 16 of switch 10 with end conductor 20 of switch 11; a conductor wire 21 connects end conductor element 17 with a lead-in conductor element 22; and a conductor wire 23 connects end conductor 24 of switch 11 with a lead-in conductor element 25. Hence, the switches, as shown, are connected in series. The elements 22 and 25 are spaced, flat, prong elements which may be inserted into standard socket elements 26, 27 which in turn are connected to insulated conductor wires 28, 29; these insulated wires being of sufficient length to extend through the device to a place outside for connection in a circuit 30 (see FIG. 7) having a source of current 31 and which may be connected to a suitable indicator device 32 which may be a light bulb to produce a visual signal; or, in a circuit to produce an audible signal, so that when the capsulated switches are activated by tipping, a signal may be given at a place remote from the place where the capsule, containing the mercury switches, is suspended.

The capsule 12 is preferably of such size as will snugly fit in a housing 35 constructed of a material, such as steel, that will provide a rugged protective sheath for the encapsulated mercury switches. As shown, the housing is constructed of standard, readily available pipe and fittings. It comprises a nipple 36, which, as shown, is of 1¼" steel pipe 6" long. The nipple is closed at its lower end by a standard, threaded cap 37 and at its upper end by standard, threaded 1½" to ¾" reducer into which is screwed a hollow plug 38 to which is secured an eye 39. The opening 40 in the upper end plug 38 is of a size to permit the flexible, insulated lead-in wires 28, 29 to pass through with a snug fit.

It should be observed that the capsule 12 is of such size and diameter that it enters into the body portion of the nipple 36 and fits snugly into the closure cap 37 and rests upon its bottom end 41.

The housing 35, which contains the encapsulated mercury switches 10, 11 is suspended at its upper end to an over-hanging bracket and aligning device 44 by means of a universal joint arrangement 45 (described later) so that the housing 35 may swing as a pendulum in all directions, the universal joint serving as a "point" from which the housing, acting as a pendulum-bob, may swing to an inclined position in any direction from its vertical axis X.

The over-hanging bracket device 4 comprises an eye 46 secured to a hollow plug 47 threaded into a bushing 48 which in turn is threaded into a lower, internally threaded alignment nipple 49 which at its upper end has secured thereto a horizontal, outwardly extending, annular flange 50. Threaded into the upper end of nipple 49 is a spacer nipple 51, threaded at both ends and provided with annular spacer shoulders 52, 53. The upper end of spacer nipple 51 is threaded into an upper alignment nipple 54, similar to nipple 49, but having its spacer flange 55 secured to it at its lower end. Threaded into the upper end of nipple 54 is a bushing 56, similar to lower bushing 48 but opposite end thereto. Threaded into upper bushing 56 is a hollow plug 57 threaded at its upper end to accommodate a hollow cap nut 58 which, together with a resilient packing ring 59 provides a packing gland through which the insulated lead-in wires 28, 29 extend; it being noted that the wires are covered with a flexible insulating tubular sheath 60. By means of the packing gland arrangement the wires may be clamped in place and also a dust-proof gland is provided.

The bracket device 44 is slidably mounted in a bracket aligning housing 61, which, as shown, is a length of 3" steel pipe provided with an annular, outwardly extending, flange 62 for mounting the housing to the top wall 63 of a bin (see FIG. 7) to any horizontally disposed plate in a bin or in other equipment where the bin level device is to be suspended. The housing pipe 61 may be of any desired length. The bracket 44, which is slidably mounted in housing 61 rests upon a stop, such as a set screw 65, threaded into a threaded bore in the wall 61a of the housing. The screw 65 extends into the interior of the housing to provide an abutment on which the lower spacer flange 50 rests; it being noted that the stop 65 is at a place to position the bracket 44 at the lower end of the housing 61 with the eye 39 partially extending beyond the lower open end of the housing 61.

The pendulum-bob 35 is connected to the bracket 44 by an arrangement which provides a universal joint; that is, one which permits the pendulum-bob to swing from its pendulum "point" in any direction from the vertical axis X. This is accomplished by connecting eye 46 with eye 39 by an S-shaped eye hook 66 in which the leg 67 providing upper hook-eye 67a extends through bracket eye 46 and the lower leg 68 providing the lower hook-eye 68a extends through the pendulum-bob eye 39.

It will be seen from the foregoing description that the bracket device 44 serves as an aligning means in the housing pipe 61 in that the spaced aligning flanges 50, 55 maintain the bracket in the center of the pipe. Also the steel pipe 61 is sufficiently rigid to maintain the bracket in any desired vertically adjusted position in a bin, since the pipe 61 may be made of any desired length whereby the bracket may be maintained at a position close to the top of the bin, or close to the bottom or at a place between top and bottom. Also, the S-shaped hook 66 permits the pendulum-bob 35 to swing in any direction at an angle to its vertical axis X. Hence, when the pendulum-bob is activated by contact with a rising pile of granular material, it will swing as a pendulum to an inclined position and will cause tilting of the mercury switches 10, 11 from normal horizontal position, which in turn causes the mercury to run to the lower end of the tilted switch. This will interrupt the flow of current through the switches which, as shown, are connected in series.

Figure 7:
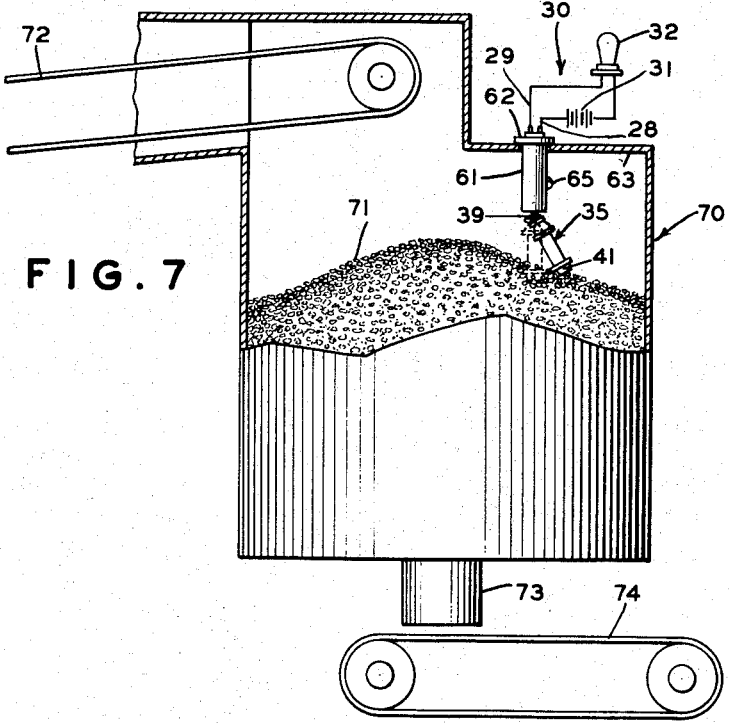
FIG. 7 is a view, largely diagrammatic, showing the indicator device installed in a bin into which and from which granular material, such as crushed rock, is conveyed.

This tilting action is illustrated in FIG. 7, wherein is shown a bin 70, into which a bulk 71 of crushed stone is charged by conveyor 72, the crushed stone being carried away from the bin through an openable and closeable discharge opening 73, on to a discharge conveyor 74. Also as clearly demonstrated in FIG. 7, the pendulum-bob 35 has been contacted by crushed stone as its level rises and has swung the pendulum-bob at an angle away from its vertical axis X, thus causing the mercury switches to be tipped, which in turn interrupts the flow of current through the circuit 28, 31, 32, 29 to operate the signalling mechanism. When the level of the pile of stone 71 is lowered the pendulum-bob 35 will return to normal vertical position as shown in dotted lines, to complete the electrical circuit.

Figure 5:
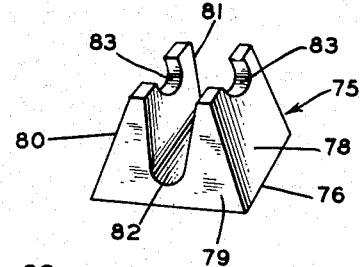
FIG. 5 is a view in perspective of a saddle or cradle for mounting the mercury switches in spaced relationship prior to encapsulation.
Figure 6:
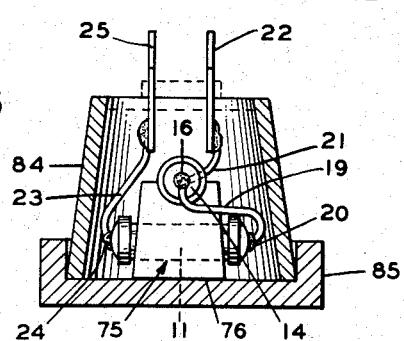
FIG. 6 is a view in elevation and in cross section showing a mold in which to form the capsule containing the mercury switches.

A preferred method of encapsulating the mercury switches 10 and 11 is illustrated in FIGS. 4, 5 and 6. As indicated in the foregoing, a suitable moldable material is used, such as a thermoplastic resin which may be initially provided in a flowable state and which after setting or curing will form a body sufficiently rigid to maintain its molded shape. While any suitable moldable which will form a rigid impact resistant body may be used, a thermosetting epoxy resin having a high resistance to shock impact has been found to be admirably suited. In some instances it may be desirable to encapsulate the mercury switches in a moldable silicone rubber, or the like, which can be molded and cured to provide a capsule of sufficient rigidity to withstand the shocks to which it will be subjected in service.

One material that has proved to be successful in making the encasing capsule is an epoxy resin presently sold under the brand name Scotchcast (No. 214). The material is furnished in two parts which are mixed to form a flowable consistency. First, a cradle or saddle 75 (see FIG. 5) is molded in a suitable form and is cured to produce a solid saddle, as shown. It will be observed that the saddle has a square bottom wall 76 and tapering side walls 78, 79, 80, 81 forming a truncated quadrangular pypramid. A recess 82 is provided across the pyramid with its bottom near the base of the saddle 75. This recess is shaped to accommodate a mercury switch, such as switch 11 (see FIG. 4). A second recess 83 is provided above the bottom of recess 82 and at right angles thereto to accommodate a second mercury switch, such as switch 10 (see FIG. 4). After the rigid saddle 75 is formed, the mercury switches 10 and 11 are rested in recesses 82, 83, and the wires 19, 21, 23 and the prong elements 22, 25 are connected as shown in FIG. 6. This assembly is then placed in a suitable mold which, as shown, comprises a tapered truncated hollow cone 84 of steel, the bottom end of which is inserted into a cup-shaped part, 85, separable from the top part 84 of the mold and forming a bottom wall for the mold. Then moldable resin, which is preferably of the same kind as used to make saddle 75, is introduced into the mold in pourable consistency to surround the assembly of saddle, switches and conductor elements. This encapsulates the assembly, leaving the spaced conductor elements 22, 25, extending above the capsule, as shown in FIG. 6. After the resin encapsulating the switches has set or cured sufficiently, the capsule 12 is removed from the mold to produce the rigid capsule, as shown, in FIG. 4. The capsule 12, is then mounted in the housing 35, as shown in FIG. 1.

It will be seen from the foregoing description that a bin level device may be made according to the invention which is of rugged, dust-proof construction to withstand rough usage such as may be encountered in installations where materials such as crushed stone and the like are handled or processed. Or, the pedulum-bob device, in some instances may be made by providing a suitable housing of the molded material itself; for example, of moldable thermosetting plastic material such as silicone rubber. Some bulk materials to be handled, are of a character such that a housing of lighter weight material than steel will better serve the intended purpose.

The terms and expressions which have been employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A level indicator device actuatable by engagement with a rising pile of granular material which comprises
   (a) a switch assembly housing of generally elongate cylindrical shape, having an upper and a lower end, the longitudinal axis of said housing running through said upper and lower ends and lying vertically when said housing is suspended from its upper end and is resting in normal position;
   (b) a switch assembly mounted within said housing, said assembly comprising a pair of mercury switches each having a tubular body closed at its ends and maintained in fixed position relative to each other within a capsule of solidified molded material snugly fitting within said housing;
   said tubular bodies being mounted one above the other with their longitudinal axes lying in substantially horizontal planes when said housing is suspended as aforesaid in normal position and
   with said longitudinal axes lying at substantially right angles to each other when viewed in plan view when said housing rests in said normal position;
   (c) a first hook means secured to the upper end of said housing providing a housing suspending means;
   (d) a mounting bracket mounted above said housing;
   (e) a second hook means secured to said bracket and connected to said first hook means in a manner providing a universal-joint means connecting said housing suspending means with said bracket,
   said universal-joint means providing a pendulum-point adjacent the top end of said housing about which said housing may swing as a pendulum-bob to an inclined angle from said vertical axis in any direction about said vertical axis; and
   (f) electrical connectors extending to the outside of said housing and connecting said switches in an electrical circuit.

2. A device according to claim 1 in which said universal-joint means comprises a first eye member secured to said housing at its upper end, a second eye member secured to said mounting bracket and an S-shaped hook member having one leg thereof extending through said first eye and the other leg thereof extending through said second eye.

3. A device according to claim 1 which includes a vertically disposed rigid tubular shield having an upper end which is securely mounted to a support and having an open lower end, and through which said electrical connectors extend; and in which said switch assembly housing comprises a pipe nipple capped at its upper end and at its lower end and in which said bracket is removably mounted within said rigid tubular shield and positioned within the lower end portion of said tubular shield.

4. A device according to claim 2 which includes a vertically disposed rigid tubular shield having an upper end which is securely mounted to a support and having an open lower end, and through which said electrical connectors extend; and in which said switch assembly housing comprises a pipe nipple, a first cap closing the upper end of said nipple and a second cap closing the lower end of said nipple, said first eye being secured to said first cap; and in which said bracket comprises a hollow vertically disposed guide member having an upper and a lower end to which said second eye is secured and spaced annular aligning flanges extending outwardly from said hollow guide member slidably mounted within said vertically disposed rigid tubular shield and positioned within the lower end portion of said rigid tubular shield.

References Cited in the file of this patent

UNITED STATES PATENTS

| | | |
|---|---|---|
| 2,214,197 | Jackson | Sept. 10, 1940 |
| 2,344,014 | Allison | Mar. 14, 1944 |
| 2,442,275 | Mayer | May 25, 1948 |
| 2,600,659 | Koch | June 17, 1952 |
| 2,692,312 | West | Oct. 19, 1954 |
| 2,812,399 | Schroeder | Nov. 5, 1957 |
| 2,862,992 | Franz | Dec. 2, 1958 |